US009162311B2

(12) United States Patent
Ott

(10) Patent No.: US 9,162,311 B2
(45) Date of Patent: *Oct. 20, 2015

(54) METHOD AND SYSTEM FOR A REMOTE WIRE FEEDER WHERE STANDBY POWER AND SYSTEM CONTROL ARE PROVIDED VIA WELD CABLES

(75) Inventor: Brian L. Ott, Sherwood, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 2137 days.

This patent is subject to a terminal disclaimer.

(21) Appl. No.: 11/625,357

(22) Filed: Jan. 22, 2007

(65) Prior Publication Data

US 2007/0114216 A1 May 24, 2007

Related U.S. Application Data

(63) Continuation of application No. 10/709,148, filed on Apr. 16, 2004, now Pat. No. 7,180,029.

(51) Int. Cl.
*B23K 9/10* (2006.01)
*B23K 9/12* (2006.01)

(52) U.S. Cl.
CPC .............. *B23K 9/1087* (2013.01); *B23K 9/124* (2013.01)

(58) Field of Classification Search
CPC .................................. B23K 9/073; B23K 9/10
USPC .......... 219/132, 130.1, 130.21, 130.51, 137.7
See application file for complete search history.

(56) References Cited

U.S. PATENT DOCUMENTS

| 2,043,331 | A | 6/1936 | Notvest |
| 2,175,891 | A | 10/1939 | Graham |
| 2,526,597 | A | 10/1950 | Winslow |
| 2,617,913 | A | 11/1952 | Oestreicher |
| 2,642,515 | A | 6/1953 | Bagg |
| 3,496,328 | A | 2/1970 | Moerke |

(Continued)

FOREIGN PATENT DOCUMENTS

| EP | 0575082 A2 | 12/1993 |
| JP | 61137675 | 6/1986 |

(Continued)

OTHER PUBLICATIONS

Hackl et al., Digitally Controlled GMA Power Sources, Fronius, www.fronius.com/worldwide/usa/products/paper_digitally_controlled_power_sources_gb.pdf Publication Date Not Provided.

(Continued)

*Primary Examiner* — Dana Ross
*Assistant Examiner* — Ayub Maye
(74) *Attorney, Agent, or Firm* — Fletcher Yoder P.C.

(57) ABSTRACT

The present invention is directed to a remotely controlled welding machine that uses serializing and modulating circuits to transfer modulated data packets to a welding power source across a weld cable. A transmitter transmits the data packets of desired welding operational parameters to a receiver disposed in the power source across a weld cable also designed to carry welding power from the power source to the wire feeder. The transmitter and other electronics of the wire feeder are constructed to use only a small amount of power which, preferably, is supplied by a DC power supply external to the wire feeder. The DC power supply is designed to provide power to the electronics of the wire feeder when the wire feeder is in a standby mode of operation.

20 Claims, 3 Drawing Sheets

(56) References Cited

U.S. PATENT DOCUMENTS

| | | | |
|---|---|---|---|
| 3,992,565 A | 11/1976 | Gatfield | |
| 4,051,344 A | 9/1977 | Robbins | |
| 4,079,231 A | 3/1978 | Toth | |
| 4,147,919 A | 4/1979 | Matasovic | |
| 4,216,367 A | 8/1980 | Risberg | |
| 4,216,368 A | 8/1980 | Delay | |
| 4,227,066 A | 10/1980 | Bulwidas, Jr. | |
| 4,247,752 A | 1/1981 | Stringer | |
| 4,266,114 A | 5/1981 | Hansen | |
| 4,410,789 A | 10/1983 | Story | |
| 4,450,340 A | 5/1984 | Corrigall et al. | |
| 4,467,174 A | 8/1984 | Gilliland | |
| 4,508,954 A | 4/1985 | Kroll | |
| 4,521,672 A | 6/1985 | Fronius | |
| 4,531,045 A | 7/1985 | Kemp | |
| 4,561,059 A | 12/1985 | Davis et al. | |
| 4,608,482 A | 8/1986 | Cox et al. | |
| 4,641,292 A | 2/1987 | Tunnell et al. | |
| 4,767,908 A | 8/1988 | Dallavalle et al. | |
| 4,769,754 A | 9/1988 | Reynolds | |
| 5,039,835 A | 8/1991 | Schwiete | |
| 5,043,557 A | 8/1991 | Tabata et al. | |
| 5,063,282 A | 11/1991 | Gilliland | |
| 5,276,305 A * | 1/1994 | Hsien | 219/132 |
| 5,376,894 A | 12/1994 | Petranovich | |
| 5,406,050 A | 4/1995 | Macomber et al. | |
| 5,653,902 A | 8/1997 | Chang | |
| 5,982,253 A | 11/1999 | Perrin | |
| 6,040,555 A * | 3/2000 | Tiller et al. | 219/132 |
| 6,103,994 A | 8/2000 | DeCoster et al. | |
| 6,114,657 A | 9/2000 | Hayes et al. | |
| 6,156,999 A | 12/2000 | Ignatchenko et al. | |
| 6,166,506 A * | 12/2000 | Pratt et al. | 318/568.12 |
| 6,225,596 B1 * | 5/2001 | Chandler et al. | 219/130.1 |
| 6,423,936 B1 | 7/2002 | Reed | |
| 6,458,157 B1 * | 10/2002 | Suaning | 623/6.63 |
| 6,466,609 B2 | 10/2002 | Koslar | |
| 6,570,132 B1 | 5/2003 | Brunner et al. | |
| 6,624,388 B1 | 9/2003 | Blankenship et al. | |
| 6,653,597 B2 * | 11/2003 | Baum | 219/137.43 |
| 6,781,095 B2 | 8/2004 | Hayes et al. | |
| 6,818,860 B1 * | 11/2004 | Stava et al. | 219/130.1 |
| 6,906,285 B2 * | 6/2005 | Zucker et al. | 219/132 |
| 6,909,285 B2 | 6/2005 | Jordan et al. | |
| 7,205,503 B2 | 4/2007 | Reynolds et al. | |
| 7,400,687 B2 | 7/2008 | Matsumoto | |
| 2001/0043656 A1 | 11/2001 | Koslar | |
| 2004/0199846 A1 | 10/2004 | Matsumoto | |
| 2006/0027546 A1 | 2/2006 | Reynolds et al. | |
| 2006/0076335 A1 | 4/2006 | Reynolds et al. | |

FOREIGN PATENT DOCUMENTS

| | | | |
|---|---|---|---|
| JP | 04162964 | 6/1992 | |
| JP | 04162966 | 6/1992 | |
| JP | H0616946 | 6/1992 | |
| JP | 05104248 | 2/1993 | |
| JP | 2003088957 A | 3/2003 | |
| JP | 2003154455 | 5/2003 | |
| JP | 2003191075 | 7/2003 | |
| JP | 2003191075 A * | 7/2003 | B23K 9/10 |
| JP | 2003236663 A | 8/2003 | |

OTHER PUBLICATIONS

Intellon, CEBus Power Line Encoding and Signaling, White Paper #0027, V. 0.1, Mar. 1997.

Echelon, "PL 3120/PL 3150 Power Line Smart Transceiver Data Book," Version 2, 005-0154-01C.

* cited by examiner

METHOD AND SYSTEM FOR A REMOTE WIRE FEEDER WHERE STANDBY POWER AND SYSTEM CONTROL ARE PROVIDED VIA WELD CABLES

CROSS REFERENCE TO RELATED CASES

The present application is a continuation of and claims priority of U.S. Ser. No. 10/709,148 filed on Apr. 16, 2004, the disclosure of which is incorporated herein by reference.

BACKGROUND OF THE INVENTION

The present invention relates generally to welding machines and, more particularly, to a method and apparatus of maintaining powering of a battery-less remote device during standby mode of operation. The invention further relates to a power source whose operation is governed by control signals provided by a controller in response to data packets received across a weld cable connecting a wire feeder to the power source.

MIG welding, formerly known as Gas Metal Arc Welding (GMAW), combines the techniques and advantages of TIG welding's inert gas shielding with a continuous, consumable wire electrode. An electrical arc is created between the continuous, consumable wire electrode and a workpiece. As such, the consumable wire functions as the electrode in the weld circuit as well as the source of filler metal. MIG welding is a relatively simple process that allows an operator to concentrate on arc control. MIG welding may be used to weld most commercial metals and alloys including steel, aluminum, and stainless steel. Moreover, the travel speed and the deposition rates in MIG welding may be much higher than those typically associated with either Gas Tungsten Arc Welding (TIG) or Shielded Metal Arc Welding (stick) thereby making MIG welding a more efficient welding process. Additionally, by continuously feeding the consumable wire to the weld, electrode changing is minimized and as such, weld effects caused by interruptions in the welding process are reduced. The MIG welding process also produces very little or no slag, the arc and weld pool are clearly visible during welding, and post-weld clean-up is typically minimized. Another advantage of MIG welding is that it can be done in most positions which can be an asset for manufacturing and repair work where vertical or overhead welding may be required.

A wire feeder is operationally connected to the power source and is designed to deliver consumable wire to a weld. To further enhance the operability of the wire feeder of a MIG welding system, known welding systems have connected the power source and the wire feeder to one another across a dedicated control cable that is in addition to a dedicated weld cable such that control signals defining the operational parameters of the power source are transmitted or fed back from the wire feeder to the power source, generally referred to as remote control.

One type of remote control device is used to regulate the operational welding parameters, and switch the welding power source output ON and OFF as well as change the power source mode via a pendant that connects to the power source by a multi-conductor cable. The solution is schematically illustrated in FIG. 1A. A wire feeder 2A is connected to a power source 4A by a control cable 6A that includes a 14-pin connector. The cable 6A used to transmit operational information to, and in some cases from the power source, may incorporate 2 to 14 conductors depending on how many functions are to be controlled. Separately connected between the power source 4A and wire feeder 2A is a high voltage weld cable 8A that delivers welding power to the wire feeder and creates a voltage potential between an electrode and a workpiece.

A significant drawback to this cable-based control is that the control cable is typically fragile relative to the welding cables designed to carry high currents at high voltages. Welding machines are commonly used at construction sites or shipyards where it is not uncommon for the welding machines to be periodically relocated or surrounded by other mobile heavy equipment operating in the same area. As such, the remote control cable can become damaged by being crushed or snagged from contact with surrounding machines and/or traffic. This can cause damage to the wire feeder and/or the welding power source if internal power conductors become shorted to signal leads that are connected to sensitive signal level circuitry.

One known system is a voltage following or voltage sensed wire feeder having an internal contactor. This solution is schematically shown in FIG. 1B. As shown, this system includes a wire feeder 2B that receives its electrical power from the voltage present in the welding circuit. The wire feeder is connected to a power source 4B via a weld cable 8B. One disadvantage of this system is that the operator has no convenient way to adjust the output of the welding power source to compensate for changes in workpiece thickness and/or fit up. The operator may call another person more conveniently located to the power source with a radio or some other means of communication to make the adjustment; however, if the operator is working alone, s/he must return to the power source to make the necessary adjustments. Another disadvantage of this system is that it requires the presence of a high current DC contactor to de-energize the welding circuit at the wire feeder. These contactors are large, heavy, costly, and require periodic maintenance to ensure proper and continual operation. The location of the secondary contactor in the remotely located wire feeder also requires that the welding circuit from the welding power source to the wire feeder remain energized even when not welding so that power is available to the wire feeder and welding arc when the gun trigger is activated. Accordingly, an open circuit voltage remains present across the weld cables. The weld cables, however, can become damaged at a worksite resulting in an unwanted arc being formed between an exposed portion of the cable and an unexpectant ground.

Another remote control solution is described in U.S. Ser. No. 10/604,482, which is assigned to the Assignee of the present application. Notwithstanding the numerous advancements achieved with the invention of the aforementioned pending application, such a system relies upon pulse width modulation to remotely transmit operational data from a wire feeder to a power source across a weld cable. By using pulse width modulated signals to remotely control operation of a power source, the amount of data as well as variability in the types of data that could be transmitted between the wire feeder and a power source is limited when compared to that which may be achieved with encoded data packets communications. This data packet also allows for error checking which improves robustness and reliability of the control. Further, with the system described in the aforementioned pending application, the wire feeder requires an internal DC power supply to power the electronics of the wire feeder. That is, the invention of the above-referenced application teaches the avoidance of an open circuit voltage between the wire feeder and power source. As a result, absent a DC power supply, the wire feeder cannot be minimally powered so as to communicate with the power source to initiate the welding process.

It is therefore desirable to design a remote controlled welding machine that receives encoded data packet command signals from a wire feeder across a weld cable to control or otherwise regulate operation of a power source. It would also be desirable to design a remote controlled welding system without needing a dedicated DC power supply disposed in a wire feeder. It would be further desirable to design a wire feeder that receives a low voltage DC input to maintain powering of wire feeder electronics when the wire feeder is in a non-welding, standby mode via only the weld cable connections.

BRIEF DESCRIPTION OF THE INVENTION

The present invention is directed to a remotely controlled welding machine that overcomes the aforementioned drawbacks. A remote control uses serializing and modulating circuits to transfer serialized and modulated data packets to a welding power source across a weld cable. The information to be communicated to the power source includes welding power source output command information (amperage/voltage control), welding circuit on/off information (power source output contactor control), and power source mode control (constant voltage/constant current). A transceiver transmits the data packets of desired welding operational parameters to a receiver disposed in the power source across a weld cable also designed to carry welding power from the power source to the wire feeder. The transceiver and other electronics of the wire feeder are constructed to use only a small amount of power which, preferably, is supplied by a DC power supply external to the wire feeder. The DC power supply is designed to provide power to the electronics of the wire feeder when the wire feeder is in a standby mode of operation. The power source includes a decoder to decode the data packet and input the decoded data to a controller for dynamic control of the power source.

Therefore, in accordance with one aspect of the present invention, a welding system is provided and includes a power source having a primary contactor and a secondary contactor. The welding system further includes a weld cable connecting the power source to a remote device. The remote device is operable in a standby mode. The welding system further includes a controller to regulate activation of the first and the second contactors such that a non-welding voltage is applied from the power source to the remote device across the weld cable when the remote device is in a standby mode.

In accordance with another aspect of the present invention, a welding system includes a power source configured to supply a first power usable during a welding process and supply a second power during a standby mode of operation. The welding system further includes a wire feeder configured to receive the first power from the power source when supplying a consumable electrode to the weld and receive the second power when in the standby mode of operation. A welding cable is provided and connects the power source and the wire feeder to one another, and is configured to carry the first and second powers thereacross.

According to another aspect of the present invention, a method of remotely controlling a power source for welding is provided. The method includes the step of packaging feedback of operational commands for a welding-type process into a data packet of encoded data. The method further includes the step of transmitting the data packet to a power source from a remote device across a weld cable designed to provide welding power for the welding-type process. The power source is controlled in accordance with at least data embodied in the data packet.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention will be described with respect to regulation of a power source and a battery-less wire feeder of a MIG welding system based on modulated feedback provided from a transceiver remote from the power source to a receiver incorporated within the power source. However, the present invention is equivalently applicable with regulating power sources of TIG, stick, flux cored, and the like welding systems. Moreover, the present invention is also applicable with non-welding, high power systems such as plasma cutters and induction heaters.

Figure 1A:
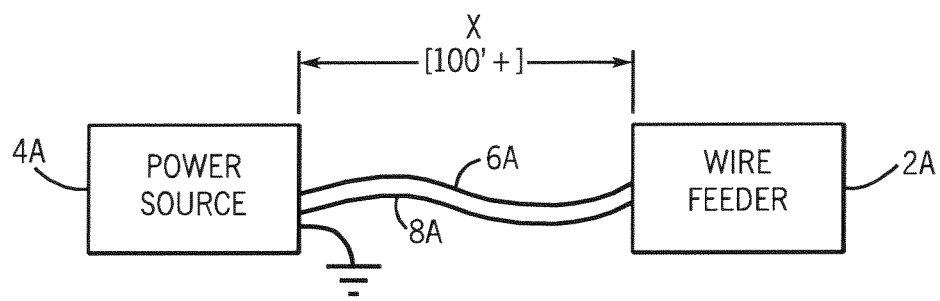
FIGS. 1A-1B are schematic block diagrams illustrating examples of known remotely controlled welding and wire feeder systems.
Figure 1B:
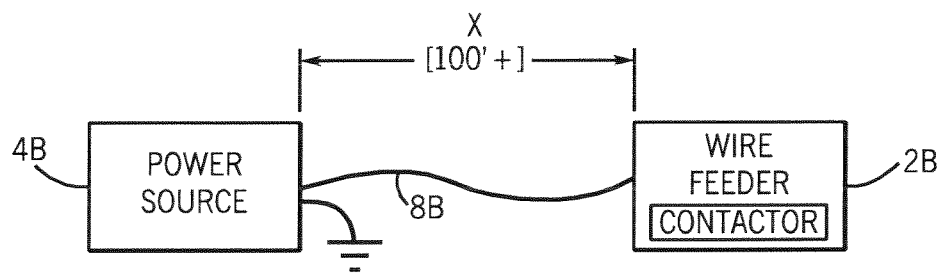
Figure 2:
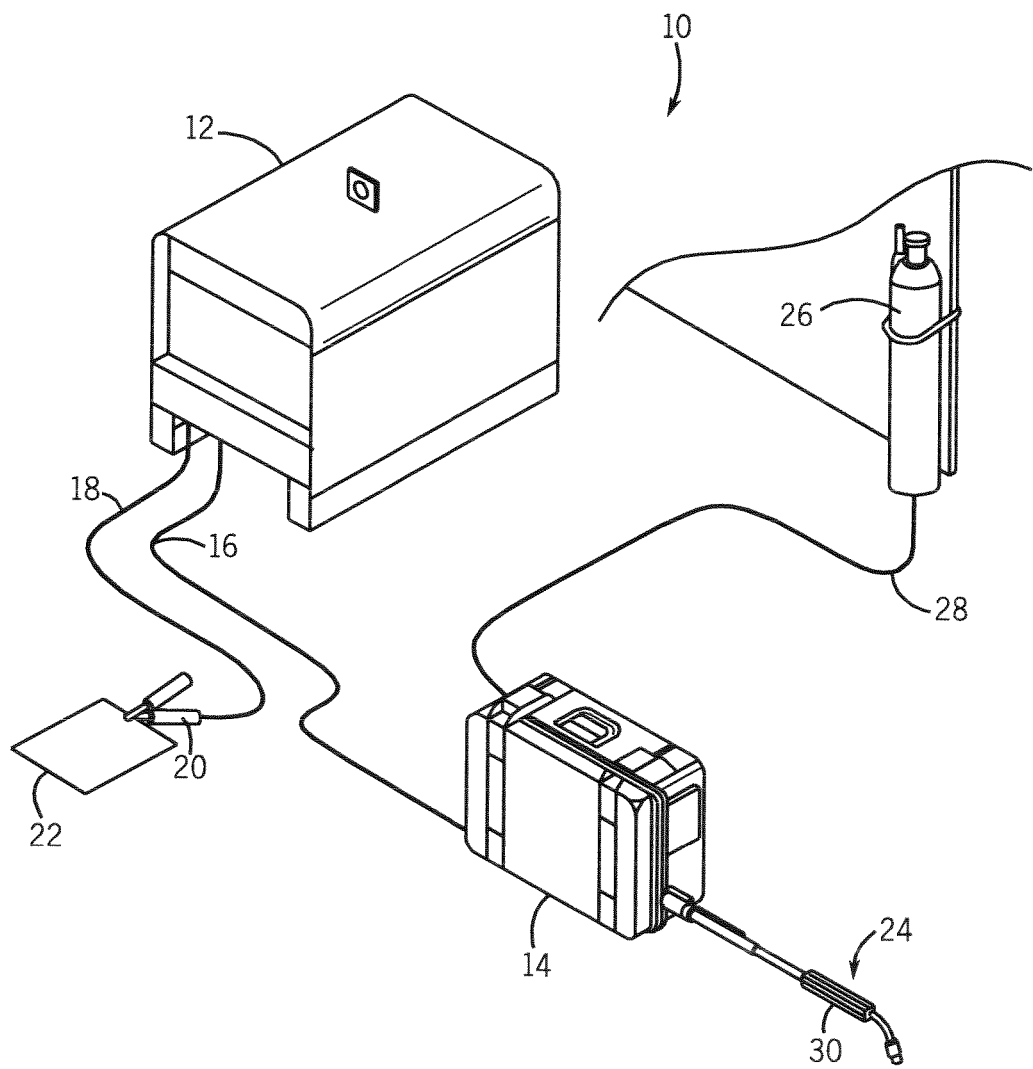
FIG. 2 is a pictorial view of a welding system in accordance with one aspect of the present invention.
Figure 3:
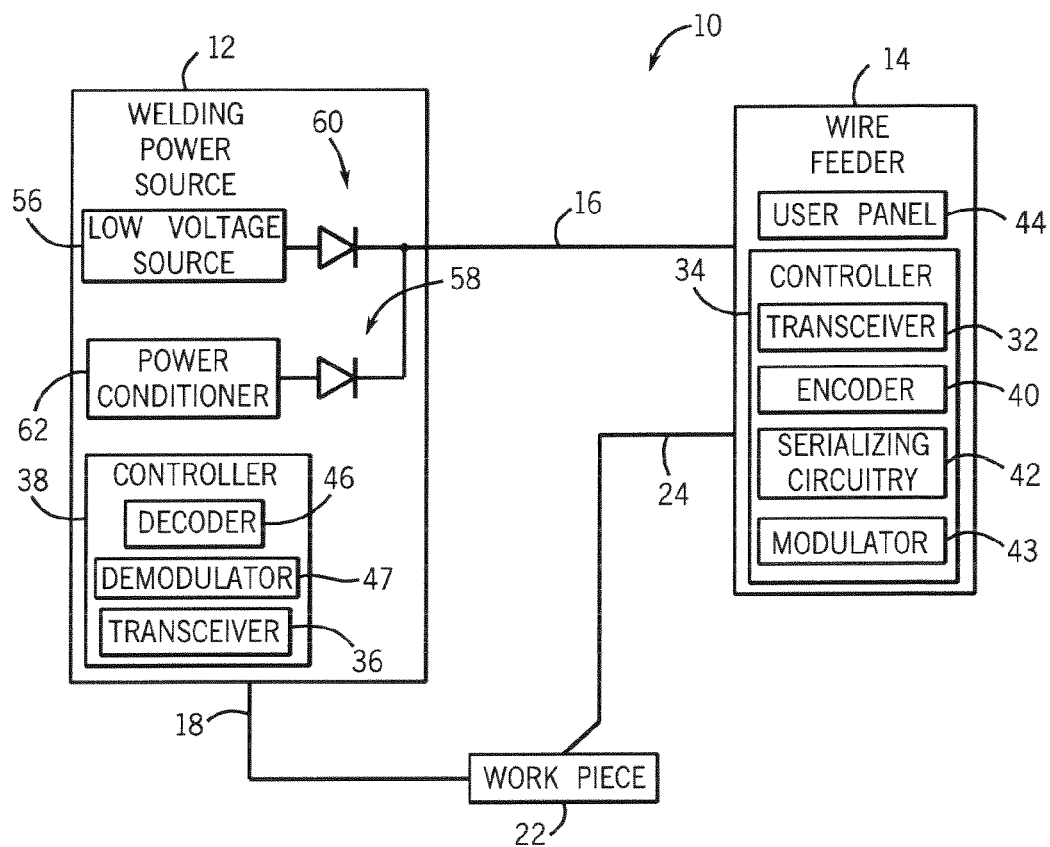
FIG. 3 is a schematic of the welding system illustrated in FIG. 2.

Referring to FIGS. 2 and 3, a MIG welding system 10 includes a welding power source 12 designed to supply power to a wire feeder 14 through a weld cable 16. The power source is designed to run in one of a number of modes including constant voltage (CV) and constant current (CC). Also connected to the power source is a secondary work weld cable 18 that connects the power source to a clamp 20 designed to receive cable 18 to workpiece 22. Also connected to wire feeder 14 is a welding gun or torch 24 configured to supply consumable welding wire to a weld. Welding system 10 may further include a gas cylinder 26 connected to wire feeder 14 such that shielding gas can be provided through gas hose 28 for the MIG welding process.

Power source 12 is designed to condition raw power supplied from a utility line or engine driven power supply and output power usable by the welding process. As such, power source 12 includes one or more transformer assemblies (not shown) to condition the raw power. The output of the power source is generally controlled by a controller and associated operational circuitry that regulates the secondary or output side of the power conditioning components. As such, the power source may be initially powered but not provide a welding output until the secondary power circuit is energized through the closing of a high current DC contactor or other switching assembly. As will be described in greater detail below, power source 12 is regulated such that a secondary or welding power output is not provided until gun 24 is activated signaling commencement of the welding process. In this regard, a welding circuit is not created between power source 12 and workpiece 22 until gun 24 is activated and is placed in relative proximity with workpiece 22.

Torch 24 is equipped with a pushbutton trigger 30 that when depressed causes a transceiver 32 of a controller 34 within wire feeder 14 to transmit command signals to a receiver 36 and power source 12 through weld cable 16. As such, a separate control cord connecting the wire feeder and power source to one another is avoided. Further, as will be described in greater detail below, wire feeder 14 is preferably constructed without a contactor assembly to close the welding circuit. That is, the power necessary for the wire feeder 14 to supply wire to the weld is not always present across weld cables 16 and 18. Accordingly, a separate contactor or switch assembly is not needed in wire feeder 14 to close the welding circuit. The customary open circuit welding voltage between a power source and a wire feeder is then eliminated because a transceiver disposed within the wire feeder transmits command signals through weld cables 16 and 18 to a receiver 36 disposed within the power source that is designed to communicate with a controller 38 of the power source such that secondary or a welding power output is not provided until the command signal is received from the transmitter 32 in the wire feeder.

This construction has a number of advantages. First, the wire feeder 14 is designed to be a portable or "suitcase" wire feeder such that reduction in weight is clearly advantageous. As such, constructing wire feeder 14 to operate without a separate contactor assembly reduces the overall weight and size of the wire feeder. Furthermore, the contactors required for high current DC applications can be quite expensive thereby increasing the overall cost of the wire feeder. Additionally, the contactor assembly is a maintenance item that may require routine maintenance for continued proper operation. Therefore, constructing wire feeder 14 without such a contactor assembly has a number of size- and cost-associated advantages.

Second, incorporation of a transceiver within wire feeder 14 that communicates with a transceiver in power source 12 directly through weld cables 16 and 18 eliminates the need for a separate control/power cable. The control cable adds to the complexity, weight, and overall cost of the welding system. Additionally, as previously noted, the control cord is typically less durable than the welding cables and, as such, is prone to nicks and snags typically associated with industrial locations. Moreover, incorporating the wire feeder without a separate contactor improves the overall current capacity of the wire feeder. That is, the rating of the contactor assembly within the wire feeder generally dictates the ampacity loads of the wire feeder. Removal of the contactor assembly thereby allows the ampacity loads to be governed by other components of the wire feeder which typically have greater maximum ampacity loads than the contactor assembly.

This invention includes at least a pair of transceivers: one in the power source and one in the wire feeder. In this regard, bidirectional communication is supported between the wire feeder and the power source. It is contemplated, however, that the wire feeder may be equipped with a transmitter and the power source with a receiver to support unidirectional communication between the two components. The transceiver in the wire feeder is designed to transmit serialized and modulated packets of feedback or commands to a transceiver in the power source across the weld cable. In one embodiment, the wire feeder operates in an on-demand fashion and, as such, when the trigger is depressed or otherwise activated, a command signal is transmitted across the weld cable to the power source that is responsive thereto and delivers welding power to the weld. This application of power, i.e. closing of the welding circuit, causes the wire feeder to deliver welding wire to the weld. As will be described more fully, the wire feeder transceiver is designed to transmit a data packet that includes information in addition to the startup command initially presented when the trigger is depressed.

The signal includes information regarding desired operational parameters of the wire feeder and instructs the transceiver of the power source to set the magnitude of the output of the welding power source (volts or amperes), the mode of the welding power source (CC or CV), and wire feed speed among other parameters. The transmitter is also configured to transmit commands regarding JOG and PURGE functions. That is, when the JOG button is pushed on the wire feeder, the transmitter automatically repeats the minimum reference command each time the open circuit voltage of the welding power source falls to zero. In accordance with known wire feeder construction, the operator may select operational parameters on a user panel of the wire feeder. In a further embodiment, the user panel may be integrated with the electrode holder or torch to allow user control of the welding process without leaving the weld.

Figure 4:
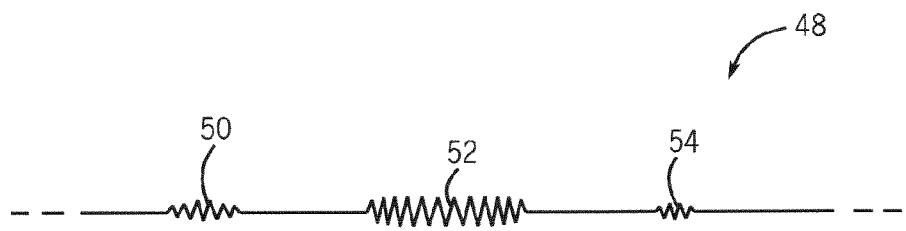
FIG. 4 is a schematic diagram of a single data packet transmittable between a wire feeder and a power source in accordance with one aspect of the present invention.

Referring again to FIG. 3, the welding system 10 is designed to provide serialized and modulated communication between the wire feeder 14 and power source 12. In this regard, controller 34 of wire feeder 14 also includes an encoder 40, serializing circuitry 42, and modulator 43. Serializing circuitry 42 is designed to serialize communications between the wire feeder and the power source based on user input to a user panel 44 and for feedback provided from the weld. Encoder 40, as will be described with respect to FIG. 4, is designed to encode the serialized transmission into data packets for improved and more efficient transmission to the power source 12. Modulation 43 is designed to modulate the data packets before transmission. A number of transmission techniques is envisioned including, but not limited to spread spectrum and pseudo-random sequenced using amplitude and/or phase-shifting. Spread spectrum technology is a method of communication that is typically implemented to secure communications and/or to overcome narrow-band constraints of a transmission line, i.e. a weld-cable.

As described above, user panel 44 is designed to receive discrete inputs from an operator that collectively define operation of a welding process. As wire feeder 14 supports digitized control of the welding process, the operator is able to input with a certain degree of specificity exact operating parameters via user panel 44. However, as welding system 10 is a remotely controlled system, controller 34 of wire feeder 14 receives the user inputs whereupon those inputs are fed to serializing circuit 42 to arrange the user input data into data packets that support streamlined communication of the control commands across a single transmission—weld cable 16.

Power source 12 also includes a decoder 46 and demodulator 47 that are matched with the encoder 40 of the wire feeder so as to demodulate and decipher the encoded signal received from transmitter 32 across weld cable 16. Based on the deciphered commands, controller 38 will regulate operation of power source 12 in accordance with the user inputs to the wire feeder 14. One skilled in the art will appreciate that communication between the power source and wire feeder may occur during welding or in stand-by. As will be described with respect to FIG. 4, decoder 46 is able to verify the accuracy of the transmitted data based on the particular encoding used.

Referring now to FIG. 4, a portion of an encoded transmission or data packet in accordance with the present invention is shown. Transmission 48 is encoded into a single data packet to include address data 50, operational control data 52, and package checksum data 54. A data packet comprises multiple bits, bytes, or words of data. Based on the configuration or encoding of this transmission, decoder 46 is able to not only receive a well-ordered transmission, but also verify the accuracy of the transmitted data by checksum 54. A checksum is an error detection mechanism having a form of a numerical value based on the number of bits or bytes in the transmitted message. In this regard, decoder 46 is able to apply a formula or algorithm used to generate the checksum value to the received message and verify that the accompanied numerical value is the same. In this regard, controller 38 of the power source can assume if the checksums do not match that the transmitted message or signal has been garbled and therefore should be ignored. Simply put, if the controller 38 based on information provided by decoder 46 determines a checksum value of the transmission that matches the checksum value 54 embedded in the transmission, the transmission is deemed to be correct and should therefore be processed accordingly.

As mentioned above, each packet comprises three sections: a preamble, the packet body, and a checksum or Cyclical Redundancy Check (CRC). Encoding of the preamble may be achieved through Amplitude Shift Keying (ASK). ASK uses alternating SUPERIOR and INFERIOR states to encode symbols. Based on the encoded pattern or states, the controller of the power source is able to properly control power output to the wire feeder. In this regard, the encoding of the preamble may be used to indicate which parameter the data of the packet body pertains. To distinguish the preamble from the packet body, another modulation scheme may be used. For example, Phase Reversal Keying (PRK) may be used to encode the packet body. PRK uses two phases of the SUPERIOR state which are, in one embodiment, 180 degrees out-of-phase from one another to encode the data. PRK is generally considered more robust than ASK. The CRC code at the end of the packet is used to improve the reliability of the communications link.

Referring again to FIG. 3, welding power source 12 may include a low voltage DC power source 56 that is used as a secondary source of voltage that may be applied across weld cable 16 when the battery-less wire feeder 14 is in an ON, but non-welding mode, i.e. standby. In this regard, the electronics to the wire feeder 14 are sufficiently powered thereby avoiding a "rebooting" of the wire feeder 14 between welding projects. One skilled in the art will appreciate, however, that after a specified time has elapsed since welding, the wire feeder 14 may be placed in shutdown.

As mentioned above, low voltage power source 56, which may be incorporated within power source 12 or the external to the power source, is designed to provide a relatively low voltage power supply to the wire feeder during standby operation of the wire feeder. In a preferred embodiment, the low voltage supply is provided across the weld cable. As such, when the low voltage source 56 is integrally disposed within the power source 12, the power source will include a primary contactor, generally referenced as diode 58, as well as secondary contactor, generally referenced as diode 60, to control the flow of power between itself and the wire feeder. That is, a primary contactor 58 is electrically connected to power conditioner 62, i.e. transformer, which is designed to condition an input power from a utility or engine driven power supply into a form usable by a welding-type process, will be used to control application of a welding (or relatively high) voltage between the wire feeder and the power source. In this regard, the primary contactor 58 is not closed so as to form a welding circuit between the wire feeder and the power source until specifically instructed to do so by operator commands received across weld cable 16 from the remote wire feeder 14. On the other hand, the secondary contactor 60 which is electrically isolated from primary contactor 58 and is electrically connected to low voltage source 56, is used to control application of a low voltage power supply 56. That is, if the power source 12 is operating and connected to wire feeder 14 or some other periphery, a low voltage will be present across cable 16 to power electronics of the wire feeder or other peripheral device. During the welding process, however, the primary voltage, or a weld voltage, will be used or otherwise "tapped" into by the wire feeder to control its electronics. It is envisioned that the wire feeder has at least three states—an OFF state, a welding (ON) state, and a standby state. Standby may be defined as a non-welding, ON state wherein the wire feeder and its electronics are energized but an active welding process is not taking place. It is desirable to put the wire feeder in standby during intervals between welding.

The voltage sensing receiver section of the remote control is configured to detect both start and reference commands from the transmitter through the weld cable. The receiver switches ON the welding power output of the power source and sets the magnitude of the power source output. The receiver includes a current sensing circuit that detects arc current and maintains the power source in an ON state while welding. The welding power output effectively squashes the standby power output provided to power the wire feeder when in a standby mode. That is, the primary and the secondary contactor in the power source are in a conductive state when welding but only the secondary contactor is conductive when the wire feeder is in standby. In this regard, the wire feeder includes circuitry to effectively "tap" into the weld voltage for powering of its electronics during welding.

As stated above, the present invention is also applicable with non-MIG welding systems such as TIG and stick welders. Further, the aforedescribed circuitry may be implemented to automatically adjust the output of a power source to compensate for losses that occur across weld cables. That is, in some manufacturing and/or industrial settings, the weld is a relatively great distance from the power source. As such, the weld cables may be dozens to over a hundred feet in length. This weld cable length results in losses from the output terminal of the power source to the weld. Simply, the voltage at the output terminals of the power source (where the weld cable is connected to the power source) may be significantly more than the voltage across the weld. Accordingly, the present invention may be used to transmit a voltage feedback signal at the weld to the power source whereupon a controller in the power source compares the voltage at the terminal to the voltage at the weld and adjusts the voltage at the terminal such that after the losses experienced across the weld cables, the voltage at the weld is at the level requested by the user.

Therefore, in accordance with one embodiment of the present invention, a welding system is provided and includes a power source having a primary contactor and a secondary contactor. The welding system further includes a weld cable connecting the power source to a remote device. The remote device is operable in a standby mode. The welding system further includes a controller to regulate activation of the first and the second contactors such that a non-welding voltage is applied from the power source to the remote device across the weld cable when the remote device is in a standby mode.

In accordance with another embodiment of the present invention, a welding system includes a power source configured to supply a first power usable during a welding process and supply a second power during a standby mode of operation. The welding system further includes a wire feeder configured to receive the first power from the power source when supplying a consumable electrode to the weld and receive the secondary power when in the standby mode of operation. A welding cable is provided and connects the power source and the wire feeder to one another, and is configured to carry the first and second powers thereacross.

According to another embodiment of the present invention, a method of remotely controlling a power source for welding is provided. The method includes the step of packaging feedback of operational commands for a welding-type process into a data packet of encoded data. The method further includes the step of transmitting the data packet to a power source from a remote device across a weld cable designed to provide welding power for the welding-type process. The power source is controlled in accordance with at least data embodied in the data packet.

The present invention has been described in terms of the preferred embodiment, and it is recognized that equivalents, alternatives, and modifications, aside from those expressly stated, are possible and within the scope of the appending claims.

What is claimed is:

1. A welding system comprising:
   a power source having a primary contactor and a secondary contactor;
   a weld cable connecting the power source to a remote device, the remote device operable in an ON mode, an OFF mode, and a standby mode; and
   a controller to regulate activation of the primary and the secondary contactors such that a non-welding voltage is applied from the power source to the remote device across the weld cable when the remote device is in the standby mode.

2. The welding system of claim 1 wherein the controller is housed in the power source.

3. The welding system of claim 1 wherein the remote device is a wire feeder having a plurality of electronics to control operation thereof.

4. The welding system of claim 3 wherein the secondary contactor is configured to close a low voltage circuit between the power source and the wire feeder when the wire feeder is in a standby mode to power the plurality of electronics.

5. The welding system of claim 1 wherein the remote device includes a transmitter configured to detect activation of a torch trigger and further configured to transmit signals indicative of a desired welding operation across the weld cable to the power source.

6. The welding system of claim 5 wherein the transmitter includes a modulator configured to modulate a power characteristic of a power signal on the weld cable to encode data packets onto the power signal.

7. The welding system of claim 5 wherein the power source includes a receiver configured to receive the signals and instruct the controller to regulate the power source according to data embodied in the signals.

8. The welding system of claim 3 further comprising a battery disposed in the power source and connected to supply a low voltage power to electronics in the wire feeder when the wire feeder is in a standby mode.

9. A welding system comprising:
   a power source comprising a primary contactor and a secondary contactor and configured to supply a first power during a welding process and supply a second power during a standby mode of operation, wherein the power source is configured to supply the second power by closing the secondary contactor and opening the primary contactor;
   a welding cable connecting the power source and a wire feeder and configured to carry the first and the second power thereacross; and
   a receiver attached to the power source and connected to receive modulated data packets from the welding cable when the power source is supplying the first power and when the power source is supplying the second power.

10. The welding system of claim 9 wherein the power source further comprises a battery to supply the second power to power electronics of the wire feeder during the standby mode of operation.

11. The welding system of claim 10 wherein the first power is sufficient to provide power for the welding process and the electronics of the wire feeder during the welding process.

12. The welding system of claim 10 wherein the wire feeder further comprises a serializing circuit to serialize the data packets, and wherein the data packets are indicative of desired operational parameters of the power source.

13. The welding system of claim 9 further comprising a decoder connected to the receiver and configured to decode operational parameters from the data packets.

14. The welding system of claim 13 further comprising a controller configured to control output of the power source in accordance with the operational parameters of the data packets.

15. The welding system of claim 14 wherein the operational parameters include at least one of power source output magnitude, power source welding mode, purging, and jogging.

16. A method of operating a power source for welding comprising the steps of:
   transmitting operational commands for a welding-type process from a user to a remote device;
   encoding the operational commands into at least one data packet;
   providing an output less than a welding-type output to the remote device by closing a primary contactor and opening a secondary contactor of the power source; and
   transmitting the at least one data packet from the power source to the remote device across a weld cable when the power source is supplying the output less than the welding-type output.

17. The method of claim 16 wherein transmitting the at least one data packet includes transmitting the at least one data packet when the power source is supplying one of the welding-type output and the output less than the welding-type output.

18. The method of claim 16 further comprising the step of serially transmitting multiple data packets from the power source.

19. The method of claim 16 wherein the output less than the welding-type output is a low voltage DC standby power applied across the weld cable.

20. The method of claim 16 wherein the step of transmitting includes modulating the power source output via at least one of spread-spectrum transmission, pseudo-random sequencing, phase-reversal-keying, and amplitude-shift-keying.

* * * * *